US012635042B2

(12) United States Patent
Lee et al.

(10) Patent No.: US 12,635,042 B2
(45) Date of Patent: May 19, 2026

(54) COOKING APPARATUS

(71) Applicant: SAMSUNG ELECTRONICS CO., LTD., Suwon-si (KR)

(72) Inventors: Changhyun Lee, Suwon-si (KR); Chulwoo Lee, Suwon-si (KR); Seunghee Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 763 days.

(21) Appl. No.: 17/993,879

(22) Filed: Nov. 24, 2022

(65) Prior Publication Data

US 2023/0093325 A1 Mar. 23, 2023

Related U.S. Application Data

(63) Continuation of application No. PCT/KR2021/006272, filed on May 20, 2021.

(30) Foreign Application Priority Data

May 26, 2020 (KR) ........................ 10-2020-0062877

(51) Int. Cl.
*H05B 6/64* (2006.01)
*F24C 15/14* (2006.01)
*F24C 15/20* (2006.01)

(52) U.S. Cl.
CPC ........... *H05B 6/6414* (2013.01); *F24C 15/14* (2013.01); *F24C 15/2042* (2013.01); *H05B 6/6423* (2013.01); *H05B 6/6435* (2013.01)

(58) Field of Classification Search
CPC ...... H05B 6/64; H05B 6/6414; H05B 6/6423; H05B 6/6429; H05B 6/6435; H05B 6/76;
(Continued)

(56) References Cited

U.S. PATENT DOCUMENTS

2004/0255871 A1* 12/2004 Hayakawa ........... H05B 6/6479 122/31.1
2010/0181308 A1* 7/2010 Lee ...................... H05B 6/6429 219/757

FOREIGN PATENT DOCUMENTS

CN 110381622 A * 10/2019 ........... H05B 6/6414
EP 2659194 B1 1/2018
(Continued)

OTHER PUBLICATIONS

International Search Report and Written Opinion for International Application No. PCT/KR2021/006272; International Filing Date May 20, 2021; Date of Mailing Sep. 15, 2021; 38 Pages.
(Continued)

*Primary Examiner* — Hung D Nguyen
(74) *Attorney, Agent, or Firm* — CANTOR COLBURN LLP

(57) ABSTRACT

Disclosed herein is a cooking apparatus having an improved drainage structure. The cooking apparatus includes a main body having a cooking chamber with an opening provided to be opened forward, and a door coupled to the main body so as to open and close the cooking chamber. The door includes a door frame, a cover glass arranged on a front surface of the door frame, a touch panel arranged between the cover glass and the front surface of the door frame and provided to be in close contact with the front surface of the door frame by being pressed by the cover glass, and a drain hole arranged at a region, corresponding to a lower end of the touch panel, of the front surface of the door frame, and provided to allow a front surface and a rear surface of the door frame to communicate with each other.

16 Claims, 15 Drawing Sheets

(58) Field of Classification Search
CPC ......... H05B 6/763; H05B 6/766; F24C 15/02; F24C 15/021; F24C 15/028; F24C 15/04; F24C 15/14; F24C 15/2042; F24C 15/32; F24C 15/327
See application file for complete search history.

(56) References Cited

FOREIGN PATENT DOCUMENTS

| | | | | | |
|---|---|---|---|---|---|
| KR | 19990030579 | U | | 7/1999 | |
| KR | 20040067641 | A | | 7/2004 | |
| KR | 20060039185 | A | | 5/2006 | |
| KR | 20070077984 | A | * | 7/2007 | ............... H05B 6/68 |
| KR | 20080070408 | A | | 7/2008 | |
| KR | 100901033 | B1 | | 6/2009 | |
| KR | 20100112339 | A | | 10/2010 | |
| KR | 200463921 | Y1 | | 12/2012 | |
| KR | 101261646 | B1 | | 5/2013 | |
| KR | 20140014430 | A | | 2/2014 | |
| KR | 20150062578 | A | | 6/2015 | |
| KR | 20170101554 | A | | 9/2017 | |

OTHER PUBLICATIONS

KIPO Notice of Preliminary Rejection; Dated Oct. 15, 2024.

* cited by examiner

COOKING APPARATUS

CROSS-REFERENCE TO RELATED APPLICATIONS

This application is a continuation application, under 35 U.S.C. § 111(a), of International Patent Application No. PCT/KR2021/006272, filed on May 20, 2021, which claims the benefit of Korean Patent Application No. 10-2020-0062877, filed on May 26, 2020, in the Korean Intellectual Property Office, the entire disclosures of each of which are incorporated herein by reference as a part of this application.

BACKGROUND

Field

The present disclosure relates to a cooking apparatus, and more particularly, to a cooking apparatus including an improved drainage structure at a lower end of a touch panel arranged between a cover glass and a door frame.

Description of Related Art

A microwave oven is a kitchen appliance that simultaneously heats and cooks food inside and outside by irradiating high-frequency waves. The microwave oven has high thermal efficiency so as to significantly reduce a cooking time of food and to reduce a loss of nutritional value in a process of cooking, defrosting, and warming the food. In addition, the microwave oven is widely used because the microwave oven is configured to directly cook food in a state in which the food is stored in a container.

Recently, an over-the-range (OTR) that incorporates a hood function for ventilation in a kitchen has been launched. The OTR is installed on a wall to minimize an installation space while more conveniently and efficiently cooking food. The OTR may be typically located above a cooking apparatus such as a gas range or a cooktop.

Therefore, in a cooking process, water vapor generated from a cooking apparatus such as a gas stove or cooktop arranged under the OTR may pass through the outside and inside of the OTR arranged above the gas stove or the cooktop.

SUMMARY

One aspect of the present disclosure provides a cooking apparatus including a main body including a cooking chamber including an opening provided to be opened forward, and a door coupled to the main body so as to open and close the cooking chamber. The door includes a door frame, a cover glass arranged on a front surface of the door frame, a touch panel arranged between the cover glass and the front surface of the door frame and provided to be in close contact with the front surface of the door frame by being pressed by the cover glass, and a drain hole arranged at a region, corresponding to a lower end of the touch panel, of the front surface of the door frame, and provided to allow a front surface and a rear surface of the door frame to communicate with each other.

The cooking apparatus may further include a connection tail from which an electric wire, which is provided to transmit a signal inputted through the touch panel, extends.

The connection tail may extend from the front surface of the door frame to the rear surface of the door frame by passing through the drain hole.

The drain hole may include a first inclined member formed on a lower end of an inner surface of the drain hole to be inclined to the rear surface of the door frame.

The connection tail may be supported by the first inclined member.

The cooking apparatus may further include a controller arranged above the drain hole, on the rear surface of the door frame. The connection tail may be connected to the controller.

The door frame may further include a cover glass seating groove recessed from the front surface of the door frame to allow the cover glass to be mounted thereon.

The cover glass seating groove may include a second inclined member formed in such a way that a surface, facing a lower surface among side surfaces of the cover glass, is inclined.

The second inclined member may be inclined downwardly toward a front side of the door frame.

The door frame may further include an auxiliary drain hole formed to allow the front surface and the rear surface of the door frame to communicate with each other.

The auxiliary drain hole may be provided in plurality, and each of the plurality of auxiliary drain holes may be arranged on opposite sides of the drain hole.

The auxiliary drain hole may be positioned lower than the drain hole.

The auxiliary drain hole may be formed in such a way that a cross-sectional area thereof gradually decreases as the auxiliary drain hole penetrates from the front surface to the rear surface of the door frame.

The door may further include a sponge provided to absorb water flowing down from the drain hole and the auxiliary drain hole, and the sponge may be arranged at a lower end of the drain hole, among edges of the rear surface of the door frame.

The door may further include a rear cover provided to cover the rear surface of the door frame and coupled to the door frame.

The rear cover may be coupled to the edge of the rear surface of the door frame while pressing the sponge.

The door frame may further include a coupling flange provided to surround and be coupled to an inner frame, to which an inner glass is fixed, facing the cooking chamber, and the coupling flange may protrude backward from the rear surface of the door frame.

The coupling flange may include a coupling flange hole formed at a region corresponding to a position, in which the drain hole is formed, and provided to penetrate the coupling flange.

The touch panel may be coupled to the cover glass by an adhesive.

The cover glass may be coupled to the door frame by an adhesive.

Another aspect of the present disclosure provides an over-the-range (OTR) including a main body, a cooking chamber formed inside the main body and including an opening provided to be opened forward, and a door rotatably coupled to the main body so as to open and close the cooking chamber, and the door includes a door frame including a first region formed on a front surface of the door frame to correspond to the opening and a second region arranged around the first region, a cover glass provided to cover the first region and the second region and arranged on the front surface of the door frame, a touch panel arranged between the cover glass and the second region and provided to be in close contact with the second region by being pressed by the cover glass, and a drain hole arranged at a region, corresponding to a lower end of the touch panel, of the second region, and provided to allow the front surface and a rear surface of the door frame to communicate with each other.

The door may further include a connection tail from which an electric wire, which is provided to transmit a signal inputted through the touch panel, extends, and a controller arranged in a region, corresponding to a portion above the second region, of the rear surface of the door frame.

The connection tail may extend from the front surface of the door frame to the rear surface of the door frame by passing through the drain hole.

The main door and the auxiliary door may further include a cover glass seating groove recessed backward from the front surface of the door frame to allow the cover glass to be mounted thereon.

The cover glass seating groove may include a second inclined member formed in such a way that a surface, facing a lower surface among side surfaces of the cover glass, is inclined.

The door frame may further include an auxiliary drain hole arranged on an upper side of the second inclined member and formed to allow the front surface and the rear surface of the door frame to communicate with each other.

The auxiliary drain hole may be provided in plurality, each of the plurality of auxiliary drain holes may be arranged on opposite sides of the drain hole, and at least one auxiliary drain hole may be positioned lower than the drain hole.

DETAILED DESCRIPTION

Figure 1:
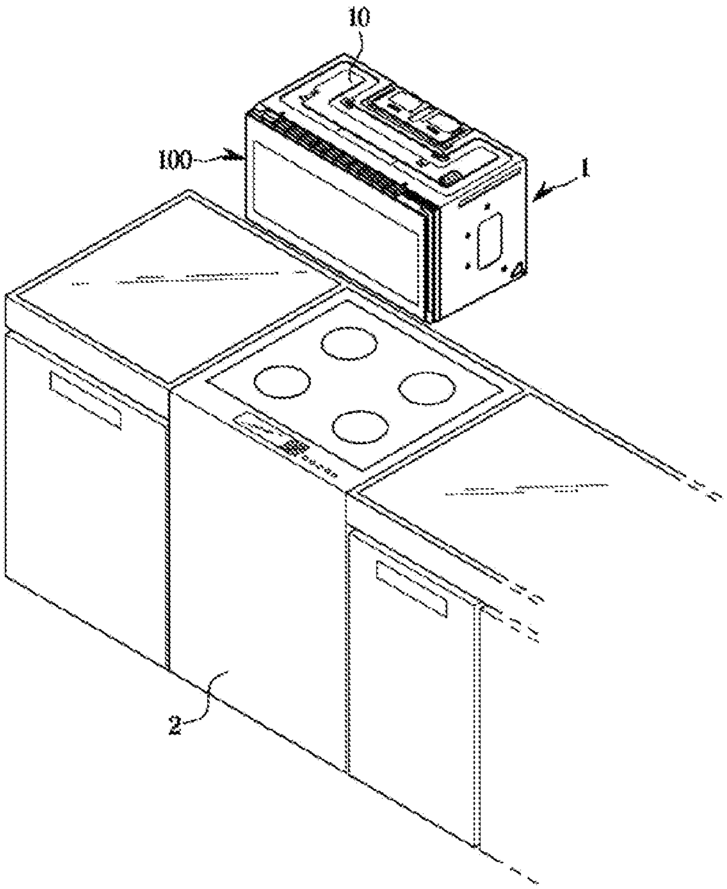
FIG. 1 is a view illustrating an installation state of a microwave oven according to one embodiment of the present disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components that perform substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "up and down direction", "lower side", "front and rear direction" and the like may be defined by the drawings, but the shape and the location of the component is not limited by the term.

Figure 2:
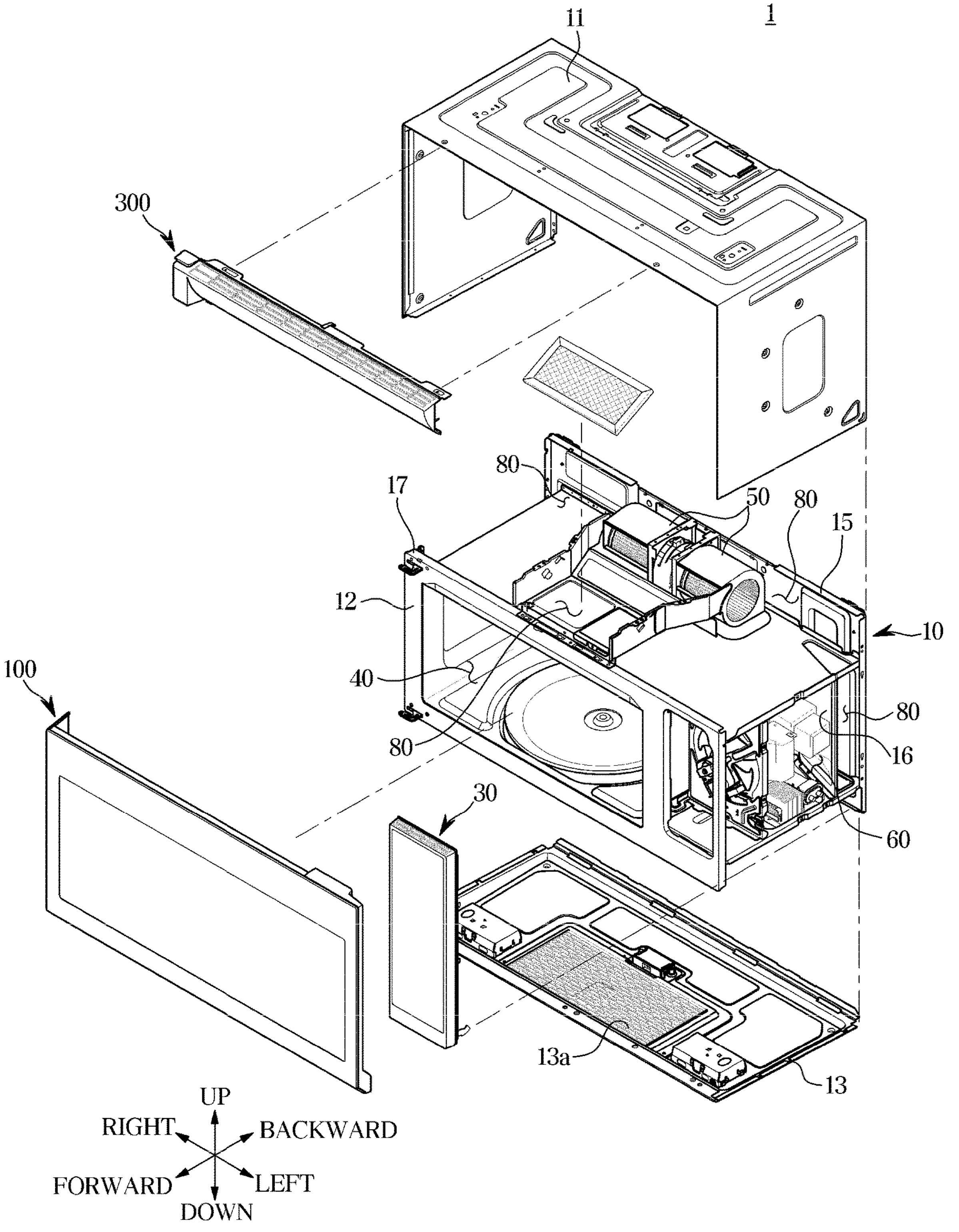
FIG. 2 is an exploded perspective view of the microwave oven shown in FIG. 1.

Particularly, as shown in FIG. 2, a direction, in which a door 100 faces, is defined as a front side, and a back, left and right sides, and upper and lower sides are defined based on this, as indicated in the key provided on FIG. 2.

Hereinafter exemplary embodiments of the present disclosure will be described in detail with reference to the accompanying drawings.

The present disclosure is directed to providing a cooking apparatus including an improved drainage structure configured to prevent a capillary action and an osmotic effect caused by a close contact structure of a cover glass, a touch panel, and a door frame.

Further, the present disclosure is directed to providing a cooking apparatus including an improved drainage structure configured to simultaneously perform a function of a through-hole of a conducting wire extending from a touch panel.

Because a drain hole formed to penetrate a door frame and provided to correspond to a lower end of a touch panel is provided, it is possible to prevent a capillary action and an osmotic effect caused by a close contact structure among a cover glass, a touch panel, and the door frame. Further, the drain hole may perform as a passage, through which an electric wire of the touch panel passes, and thus an efficiency in a manufacturing process may be increased.

According to one embodiment of the present disclosure, a microwave oven incorporating a hood function 1 among cooking apparatuses will be described as an example, but the present disclosure is not limited thereto, and any cooking apparatus having a hood function may be applied.

FIG. 1 is a view illustrating an installation state of a microwave oven according to one embodiment of the present disclosure. FIG. 2 is an exploded perspective view of the microwave oven shown in FIG. 1.

Referring to FIGS. 1 to 2, the microwave oven incorporating a hood function 1 may be installed above one or more other cooking apparatuses 2. The microwave oven 1 may be referred to as a wall-mounted microwave oven or Over The Range (OTR). Hereinafter, the term “microwave oven” may refer to the microwave oven incorporating a hood function 1. In one embodiment of the present disclosure, the term ‘cooking apparatus’ other than the term ‘other cooking apparatus’ may generally refer to the microwave oven 1 described herein.

The microwave oven 1 includes a cabinet 11 forming an exterior of a main body 10. The cabinet 11 may be positioned above the other cooking apparatus 2, and a rear surface of the microwave oven 1 may be fixedly coupled to a wall. However, the present disclosure is not limited thereto, and a side surface of the cabinet 11 or an upper surface of the cabinet may be fixedly coupled to a wall or other structure (e.g., ceiling or the like). In addition, according to the user’s selection, the microwave oven 1 may be used as a wall-mounted microwave oven by being coupled to the wall, or may be used in a state of being placed on an installation surface (such as on a shelf or counter).

The cabinet 11 may include a top cover forming an upper surface and both side surface of the cabinet 11, and a hood plate 13 including an inlet 13*a* through which exhaust gas and vapor generated from the other cooking apparatus 2 is introduced. The cabinet 11 may include a front frame 12 forming a front surface of the cabinet 11 and a rear plate 15 forming a rear surface of the cabinet 11. The top cover, the front frame 12, the hood plate 13, and the rear plate 15 may be provided separately, or some or all of the top cover, the front frame 12, the hood plate 13, and the rear plate 15 may be provided integrally with each other.

The main body 10 may be divided into a cooking chamber 40 with an open front to allow food to be put therein, and an electrical room 60 formed outside the cooking chamber 40 and in which various electrical components are installed. Particularly, the exterior of the main body 10 may be formed by the top cover, the hood plate 13, the front frame 12, and the rear plate 15, and in this case, all or part of the space between the cooking chamber 40 and the cabinet 11 may correspond to the electrical room 60.

A door 100, in which one side thereof is hinged to the cabinet 11 so as to open and close the cooking chamber 40, may be installed on a front surface of the cabinet 11. The door 100 may shield the open front surface of the cooking chamber 40. A tray (not shown) on which food is placed may be provided inside the cooking chamber 40, and a motor may be installed under the tray to rotate the food together with the tray.

A control panel 30 configured to allow a user to interact with and control operation of the microwave 1 may be coupled to the front surface of the cabinet 11. The control panel 30 may, for example, allow a user to select a microwave intensity or an operating time according to an amount of food or based on other criteria. Alternatively, the control panel 30 may be provided next to the cooking chamber 40. The control panel 30 may be arranged at a rear of the door 100 to be covered by the door 100 in response to the door 100 being closed, but is not limited thereto. Alternatively, the control panel 30 may be arranged next to the door 100 so as to be exposed to an outside even when the door 100 is closed.

A hood flow path 80, through which air including exhaust gas sucked through the inlet 13*a* flows, may be formed inside the cabinet 11. As shown in FIG. 2, a partition plate 16 is provided to define and separate the hood flow path 80 and the electrical room 60 to prevent the air flowing through the hood flow path 80 from passing into the electrical room 60. However, the present disclosure is not limited thereto, and the partition plate 16 may be omitted. In such a configuration, there may be no division between the electrical room 60 and the hood flow path 80, and all or part of the space between the cooking chamber 40 and the cabinet 11 may correspond to the hood flow path 80.

One end of the hood flow path 80 communicates with the inlet 13*a* and the other end of the hood flow path 80 communicates with an outlet 300. Therefore, after air containing exhaust gas is introduced from the outside of the microwave oven 1 through the inlet 13*a*, the air may flow along the hood flow path 80 inside the main body 10 and then be discharged to the outside of the microwave oven 1 through the outlet 300.

The microwave oven 1 may include one or more blowers 50 provided to generate an airflow in the hood flow path 80 for a hood function. The blower(s) 50 may be installed inside the cabinet 11. Particularly, the blower(s) 50 may be arranged at a rear upper end inside the cabinet 11, and may be arranged on or in the hood flow path 80.

Hereinafter a configuration of the door 100 according to one embodiment of the present disclosure will be schematically described with reference to FIGS. 3 to 5.

Figure 3:
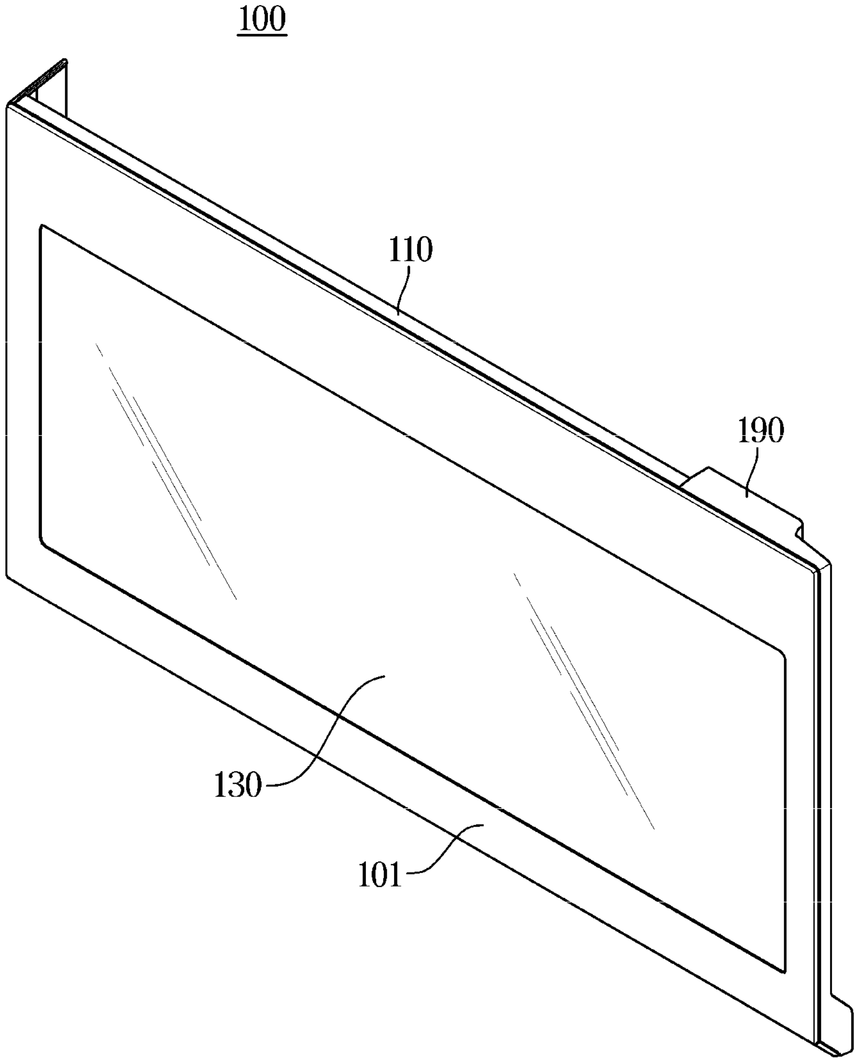
FIG. 3 is a perspective view of a door of the microwave oven shown in FIG. 2.

FIG. 3 is a perspective view of a door of the microwave oven shown in FIG. 2. FIG. 4 is an exploded perspective view of the door of the microwave oven shown in FIG. 3 when viewed from a front side. FIG. 5 is an exploded perspective view of the door of the microwave oven shown in FIG. 3 when viewed from a rear side.

A configuration of the door 100 when viewed from a front side of the door 100 according to an embodiment of the present disclosure will be described with reference to FIGS. 3 and 4.

Referring to FIG. 3, the door 100 includes a door frame 110, a cover glass 130, and an edge cover 101. The door frame 110 may be formed in a shape corresponding to the front surface of the main body 10. The door frame 110 may be formed in a shape corresponding to an edge of the front surface of the main body 10.

The door 100 may be coupled to the main body 10 and may be configured to open and close the cooking chamber 40. Referring to FIG. 2, the door 100 may be rotatably coupled to the main body 10. The door 100 may be provided to be rotatable with respect to the main body 10 by being connected to hinges 17 coupled to both corners of the front frame 12 of the main body 10. However, a method of opening and closing the cooking chamber 40 of the door 100 may be provided by various methods, such as moving the door 100 up and down, left and right, or forward and backward, in addition to or alternatively to rotating the door 100 about the hinges 17.

The door frame 110 may include a door frame opening provided in a shape corresponding to the open front surface of the cooking chamber 40 that is the opening of the cooking chamber 40. A partial region of the front surface of the door frame 110 in which the door frame opening is formed may be defined as a first region F1, as shown in FIG. 4. The first region F1 may be provided on the front surface of the door frame 110.

The door frame 110 may include a second region F2 arranged around the first region F1. A region in which a touch panel 141, which will be described later, is located may be defined as the second region F2. Referring to FIG. 4, the second region F2 may be arranged on the left side of the first region F1. However, the position of the second region F2 is not limited to the above-described position, and may be provided in various positions, such as the upper and lower sides, left and right sides of the first region F1, in order to efficiently receive the user's input or control information.

A drain hole 150 may be provided in a region, corresponding to a lower end of the touch panel 141, of the second region F2. A detailed description of the drain hole 150 will be described later.

An adhesive application region 200*a* to which an adhesive is applied to allow the cover glass 130 to be coupled thereto may be provided at upper and lower ends of the door frame 110. The adhesive application region 200*a* of the door frame 110 is not limited to the position(s) shown in FIG. 4 and may be provided in one or more different regions. Accordingly, the adhesive application region 200*a* may be provided over various regions of the front surface of the door frame 110 that increases a bonding force between the door frame 110 and the cover glass 130.

The touch panel 141 may be arranged in front of the door frame 110. The touch panel 141 may be arranged in a partial region of the front surface of the door frame 110, particularly, in front of the second region F2. The touch panel 141 may be in close contact with the second region F2 by being pressed by the cover glass 130. The touch panel 141 may be in close contact with the cover glass 130 to receive inputs and/or control information for the operation of the microwave oven 1 from a user. As for an operating principle of the touch panel 141, a capacitive method may be applied as a touch method. However, the touch method of the touch panel 141 is not limited to the above-described capacitive method, but may be provided in various touch methods. For example, buttons, toggles, switches, and the like or other non-mechanical mechanisms may be used without departing from the scope of the present disclosure.

The touch panel 141 may be adhered to a rear surface of the cover glass 130. The touch panel 141 may be provided with an adhesive application region 200*a*, to which an adhesive is applied, so as to be adhered to the rear surface of the cover glass 130. The adhesive applied to the adhesive application region 200*a* may be the same material as the adhesive of the door frame 110 described above. As shown in FIG. 4, the adhesive application region 200*a* may be applied along imaginary lines extending in a vertical direction on both ends of the left and right sides of the touch panel 141. The adhesive application region 200*a* of the touch panel 141 is not limited to the position shown in FIG. 4, and may be provided in a different region. Accordingly, the adhesive application region 200*a* may be provided over various regions of the front surface of the door frame 110 that increases a bonding force between the touch panel 141 and the cover glass 130.

Figure 4:
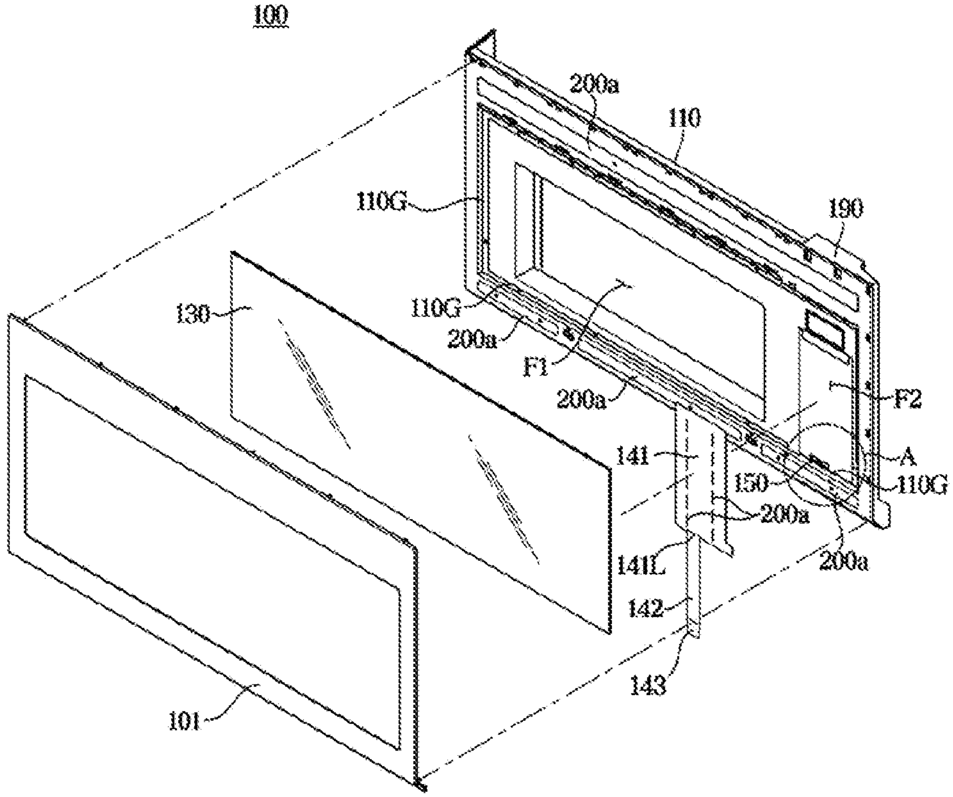
FIG. 4 is an exploded perspective view of the door of the microwave oven shown in FIG. 3 when viewed from a front side.

Referring to FIG. 4, the touch panel 141 may have a substantially rectangular shape. However, the shape of the touch panel 141 is not limited thereto, and may be provided in various shapes. A touch panel mounting member corresponding to the shape of the touch panel 141 may be formed in the second region F2. The touch panel mounting member may be recessed on the second region F2 of the door frame 110 to correspond to the shape of the touch panel 141.

A connection tail 142 provided to transmit an electrical signal, which is formed by the touch panel 141, to a controller 160 (FIG. 5) to be described later may extend from a lower end of the touch panel 141. The connection tail 142 may be provided as a flexible printed circuit board (FPCB). The connection tail 142 may be provided in a shape of a substantially long narrow rectangle. However, the shape of the connection tail 142 is not limited thereto and may be provided in various shapes.

A connection terminal 143 may be provided at an end of the connection tail 142. The connection terminal 143 may be electrically and physically connected to the controller 160.

Referring to FIG. 4, the cover glass 130 may be arranged on the front surface of the door frame 110. The cover glass 130 may be arranged in front of the touch panel 141. The cover glass 130 may be in close contact with the front of the door frame 110 while pressing the touch panel 141 toward the front surface of the door frame 110. The front surface of the touch panel 141 may be attached to the rear surface of the cover glass 130. The touch panel 141 may be attached to a region, corresponding to the second region F2, of the rear surface of the cover glass 130.

A cover glass seating groove 110G in which the cover glass 130 is mounted may be formed on the front surface of the door frame 110. The cover glass seating groove 110G may be formed in a shape corresponding to the shape of the cover glass 130. The cover glass seating groove 110G may be formed by being recessed from the front surface that is placed on the most forward of the door frame 110. A second inclined member 113 (FIG. 6) may be formed in a portion, facing the side surface of the cover glass 130, of the cover glass seating groove 110G. A detailed description of the second inclined member 113 will be described later.

Referring to FIG. 4, the edge cover 101 may be provided in front of the cover glass 130. The edge cover 101 may be provided to correspond to the shape of the cover glass 130. The edge cover 101 may be formed to correspond to the shape of an edge 114 (FIG. 5) of the door frame 110. The edge cover 101 may be fixed to the door frame 110 by pressing the cover glass 130 toward the front surface of the door frame 110.

The edge cover 101 may include an opening corresponding to the shape of the cover glass 130. Through the opening of the edge cover 101, a user can check a cooking state of the cooking chamber 40, such as by viewing through the cover glass 130. Through the opening of the edge cover 101, a user can input control information, for the operation of the microwave oven 1, to the touch panel 141 attached to the rear surface of the cover glass 130.

The configuration of the door 100 when viewed from a rear side of the door 100 according to one embodiment of the present disclosure will be described with reference to FIGS. 3 and 5.

The door frame 110 may include the door frame opening provided in a shape corresponding to the open front surface of the cooking chamber 40 that is the opening of the cooking chamber 40. A partial region of the front surface of the door frame 110 in which the door frame opening is formed may be defined as the first region F1 (FIG. 4). The first region F1 may be provided on the front surface of the door frame 110. A region R1, corresponding to the first region F1, of the rear surface of the door frame 110 may be provided on the rear surface of the door frame 110.

The door frame 110 may include the second region F2 arranged around the first region F1 (FIG. 4). A region in which the touch panel 141 is located may be defined as the second region F2. The second region F2 may be provided on the front surface of the door frame 110. A region R2, corresponding to the second region F2, of the rear surface of the door frame 110 may be provided on the rear surface 110*b* of the door frame.

Referring to FIGS. 4-8, the drain hole 150 may be provided in the region R2, corresponding to the second region F2, of the rear surface of the door frame 110. The drain hole 150 may be provided in a region, corresponding to the lower end of the touch panel 141, of the second region F2. The drain hole 150 may be formed to penetrate the door frame 110 so as to be connected from the front surface of the door frame 110 to the rear surface of the door frame 110.

Figure 5:
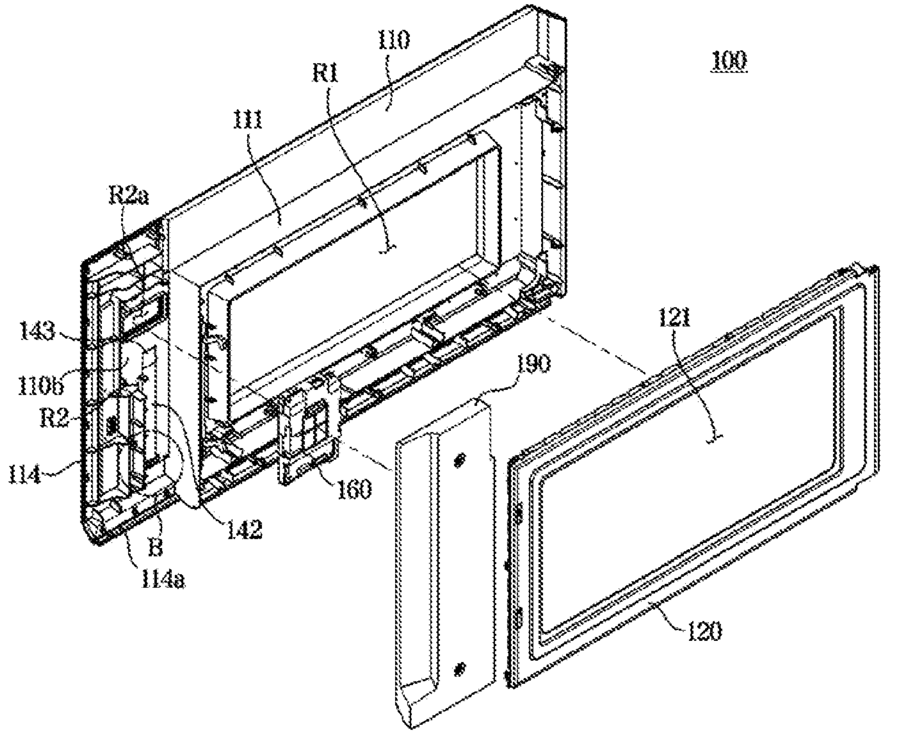
FIG. 5 is an exploded perspective view of the door of the microwave oven shown in FIG. 3 when viewed from a rear side.

Referring to FIGS. 4-5, the controller 160 may be arranged on an upper end of the second region F2. The controller 160 may receive an electrical signal from the touch panel 141 to control a cooking operation of the microwave oven 1. A position, in which the controller 160 is arranged, may be an upper member R2*a*, which is above the drain hole 150, in the region R2 corresponding to the second region F2, on the rear surface of the door frame 110.

The connection tail 142 may extend from the front surface to the rear surface of the door frame by passing through the drain hole 150. The connection tail 142 extending to the rear surface of the door frame 110 through the drain hole 150 may be bent upward to be connected to the controller 160. The connection tail 142 may be connected to the controller 160 through the connection terminal 143.

Referring to FIGS. 2 and 5, a rear cover 190 provided to cover the controller 160, the drain hole 150, and the connection tail 142 may be arranged at the rear of the door frame 110. The rear cover 190 may be provided to cover a portion of the rear surface of the door frame 110. At the rear of the door frame 110, the rear cover 190 may be coupled to the door frame 110. The rear cover 190 may be provided in a shape corresponding to the edge 114 of the door frame.

Referring to FIG. 5 based on the direction of the drawings shown in FIG. 2, the rear cover 190 may be arranged on the left side on the rear surface of the door frame 110. However, the shape and arrangement position of the rear cover 190 is not limited to the position shown in FIG. 5, and may be provided in various ways according to the formation position of the second region F2.

Referring to FIG. 5, an inner frame 120 may be arranged at the rear of the door frame 110. The inner frame 120 may correspond to the shape of the opening of the cooking chamber 40 and provided to be in close contact with the door frame 110 in a state in which the door is closed. The inner frame 120 separated from the cover glass 130 may be provided to fix an inner glass 121 provided to insulate properties of the microwave oven 1 and protect a user from microwave radiation.

An opening having a shape corresponding to the inner glass 121 may be formed in a center of the inner frame 120. The opening formed in the center of the inner frame 120 may be provided in a shape corresponding to the opening formed in the first region F1 of the door frame 110, thereby improving a visibility of the inside of the cooking chamber 40 for a user.

The door frame 110 may further include a coupling flange 111 provided to surround the inner frame 120 and coupled to the inner frame 120. The coupling flange 111 may protrude backward from the rear surface of the door frame 110. The coupling flange 111 may be formed in the region R1, corresponding to the first region F1, of the rear surface of the door frame 110. The coupling flange 111 may be provided to define the region R1, corresponding to the first region F1, of the rear surface of the door frame 110 and the coupling flange 111 may be provided to define the region R2, corresponding to the second region F2, of the rear surface of the door frame 110.

Hereinafter a shape and formation position of the drain hole 150 according to one embodiment of the present disclosure will be described in detail with reference to FIGS. 6 to 12.

Figure 6:
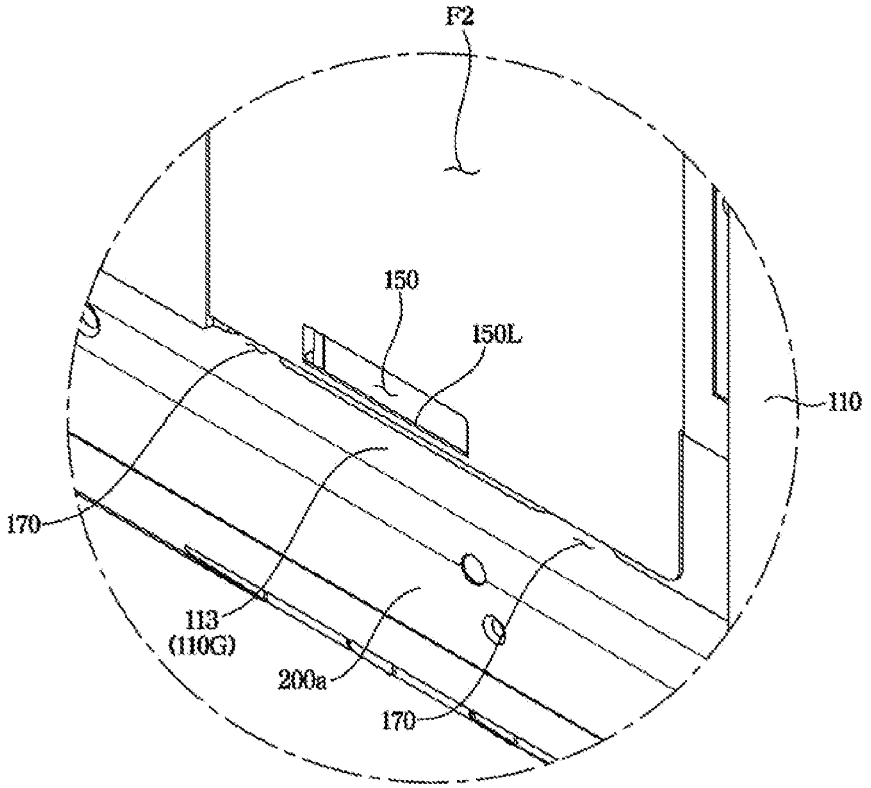
FIG. 6 is an enlarged view of region A indicated in FIG. 4.
Figure 7:
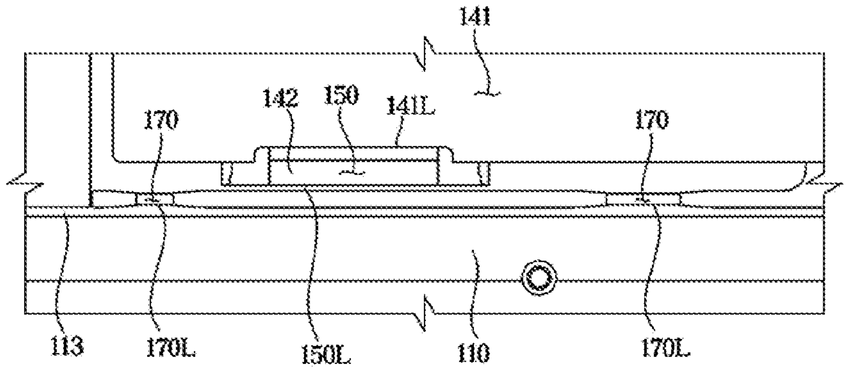
FIG. 7 is a front view of a drain hole and a peripheral region of FIG. 6.
Figure 8:
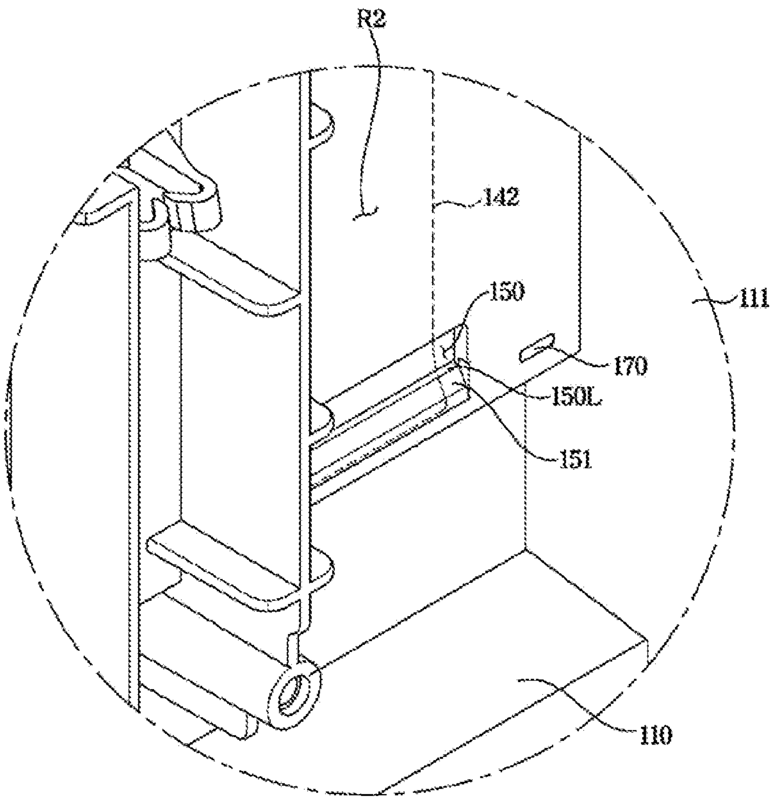
FIG. 8 is an enlarged view of region B indicated in FIG. 5.
Figure 9:
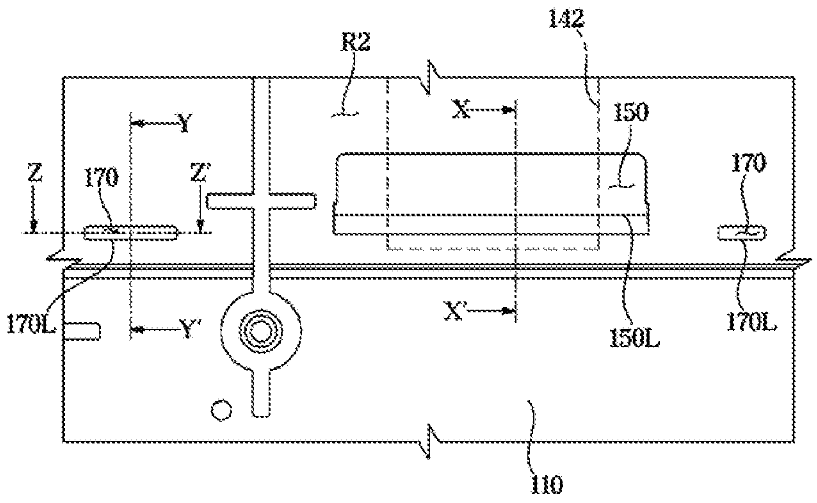
FIG. 9 is a front view of the drain hole and the peripheral region of FIG. 8.
Figure 10:
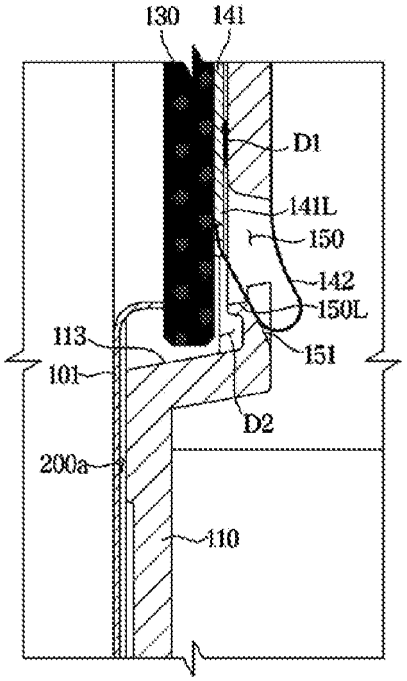
FIG. 10 is a sectional view taken along line X-X' of FIG. 9.
Figure 11:
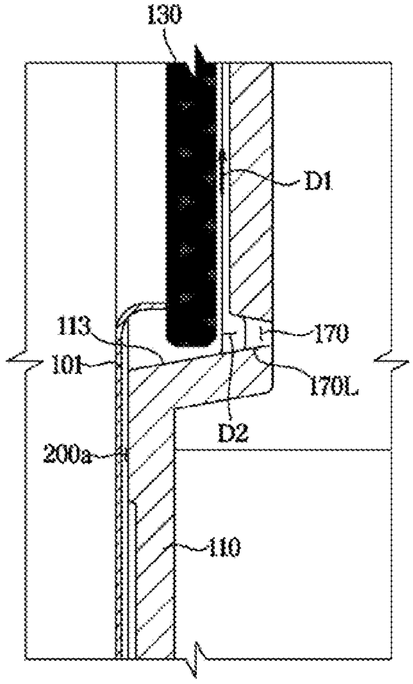
FIG. 11 is a sectional view taken along line Y-Y' of FIG. 9.
Figure 12:
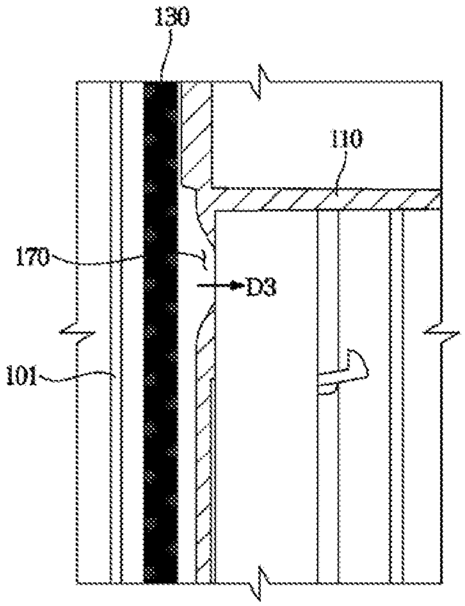
FIG. 12 is a sectional view taken along line Z-Z' of FIG. 9.

FIG. 6 is an enlarged view of the region A indicated in FIG. 4. FIG. 7 is a front view of a drain hole 150 and a peripheral region of FIG. 6. FIG. 8 is an enlarged view of the region B indicated in FIG. 5. FIG. 9 is a front view of the drain hole 150 and the peripheral region of FIG. 8. FIG. 10 is a sectional view taken along line X-X' of FIG. 9. FIG. 11 is a sectional view taken along line Y-Y' of FIG. 9. FIG. 12 is a sectional view taken along line Z-Z' of FIG. 9.

In a state in which components of the door 100 are assembled through a manufacturing process, the cover glass 130, the touch panel 141, and the front surface of the door frame 110 are maintained in a state of sequentially being in close contact with each other (i.e., stacked or layered).

Referring to FIG. 10, even though the cover glass 130, the touch panel 141, and the front surface of the door frame 110 are in close contact with each other, a gap of a very small width is inevitably formed.

As for the OTR among the microwave ovens 1, water vapor, which is generated during a cooking process of the other cooking apparatus, may be structurally introduced into the inside of the OTR through a lower region of the OTR. Further, water vapor that is generated inside the cooking chamber of the OTR may also be introduced into the inside of the door 100.

Therefore, in a state in which the water vapor is condensed and due to gravity, water is collected in a space in a lower side of the gap formed by the internal components of the door 100, such as the cover glass 130, the touch panel 141, and the front surface of the door frame 110, a capillary action may occur. Due to the capillary action, water collected in the space in the lower side of the gap may flow into the gap.

Further, in the gap structure formed by the cover glass 130, the touch panel 141, and the front surface of the door frame 110, impurities generated during the cooking process may be easily collected in the gap in comparison with the relatively large space in the lower side of the gap. Therefore, a concentration difference may occur between the gap and the space in the lower side of the gap. Due to the osmotic effect, the collected water may flow from the space in the lower side of the gap to the gap having a relatively high concentration.

Due to the water, which is moved to the gap, flowing into the touch panel 141, a short circuit or malfunction of the touch panel 141 may occur. Accordingly, a door structure configured to prevent water from flowing through the gap formed by the cover glass 130, the touch panel 141 and the front surface of the door frame 110 may be required. Before the collected water flows into the gap caused by the capillary action or the osmotic effect, the collected water may be removed by using the above-mentioned door structure. Accordingly, it is possible to prevent the short circuit or malfunction of the touch panel 141.

FIG. 6 is an enlarged-perspective view of a partial region of the door frame 110 in which the touch panel 141 and the connection tail 142 are removed (i.e., not shown). FIG. 7 is a front view of the drain hole 150 and a peripheral region of FIG. 6 in a state in which the touch panel 141 and the connection tail 142 are arranged in front of the second region F2. FIGS. 8 and 9 are views illustrating a state in which the connection tail 142 extends to the rear surface of the door frame and then bent upward.

Referring to FIGS. 6, 7, and 10, a region, in which the touch panel 141 is located, of the front surface of the door frame 110 may be defined as the second region F2. The drain hole 150 may be formed in a region, corresponding to a lower end 141L of the touch panel 141, of the second region F2. The drain hole 150 may be formed to allow the front and rear surfaces of the door frame 110 to communicate with each other. The drain hole 150 may be formed to penetrate the door frame 110.

The connection tail 142 may extend from the lower end of the touch panel 141. A length of a left and right width of the connection tail 142 may be less than a length of a left and right width of the touch panel 141. The connection tail 142 may extend from the front surface of the door frame 110 to the rear surface of the door frame 110 by passing through the drain hole 150.

Referring to FIGS. 6, 7, and 10, a shape of the drain hole 150 may be approximately rectangular when viewed from the front side. A length of a left and right width of the drain hole 150 may be formed to correspond to the width of the connection tail 142. The shape of the drain hole 150 may be provided in various shapes through which the connection tail 142 extends from the front surface of the door frame 110 to the rear surface of the door frame 110. In other words, the drain hole 150 may be provided in various shapes that is formed in a region, corresponding to the lower end 141L of the touch panel 141, of the second region F2, and that allows the connection tail 142 to pass through the drain hole 150.

In a conventional microwave oven, the drain hole 150 shown in FIGS. 6 to 12 is not provided. That is, the drain hole 150, which penetrates the door frame 110 to allow the front surface and the rear surface of the door frame 110 to communicate with each other, is not formed on the front surface of the door frame 110 in such conventional microwave ovens.

Accordingly, water formed by the condensed water vapor is collected at a corner D2 (FIG. 10) in which the front surface (for example, the second region F2) of the door frame 110 and an inclined surface of the second inclined member 113 of the cover glass seating groove 110G intersect with each other. Along a direction D1, the collected water may flow into the gap formed by the cover glass 130, the touch panel 141, and the front surface of the door frame 110. The corner D2 may correspond to a space positioned in the lower side of the gap formed by the cover glass 130, the touch panel 141, and the front surface of the door frame 110.

The drain hole 150 may be formed at the above-described position, and thus it is possible to prevent the flow of the collected water along the direction D1. Particularly, referring to FIG. 10, the drain hole 150 may perform a drainage function in which, even if a level of the collected water reaches a lower end 150L of the drain hole 150, the water is no longer collected and flows from the front surface of the drain hole 150 to the rear surface of the drain hole 150.

As for the front touch panel structure, a conducting wire penetrating the front and rear surfaces of the frame and performing an electrical connection function between the touch panel and the controller is required. The drain hole 150 may be formed at the above-described position to allow the connection tail 142 to pass therethrough while performing the drainage function. That is, the connection tail 142 may pass through the drain hole 150 without negatively impacting the water drainage functionality described herein.

That is, without a separate through hole, the drain hole 150 may simultaneously perform the functions of drainage and penetration (e.g., electrical connection through hole).

Referring to FIGS. 7 and 10, the lower end 150L of the drain hole 150 formed on the front surface of the door frame 110 may be formed at a lower position than the lower end 141L of the touch panel 141. Particularly, the lower end 150L of the drain hole 150 may be formed such that an extension start point of the connection tail 142 extending from the lower end of the touch panel 141L does not come into contact with the collected water.

Referring to FIGS. 8 to 10, the drain hole 150 may include a first inclined member 151. The first inclined member 151 may be formed on a lower end of an inner surface of the drain hole 150 to be inclined to the rear surface of the door frame 110. Referring to FIG. 10, the first inclined member 151 may be inclined from a middle point of the lower inner surface of the drain hole 150 to the rear surface of the door frame 110. Alternatively, the first inclined member 151 may be inclined downwardly from the lower end 150L of the drain hole formed in the front surface of the door frame 110. The collected water may be more easily drained through the inclined structure of the first inclined member 151.

Referring to FIG. 10, a portion of the connection tail 142 passing through the drain hole 150 may be supported by the first inclined member 151. The portion of the connection tail 142 may be supported by the first inclined member 151 and then bent upward to be connected to the controller 160. Because the connection tail 142 is more gently bent by the first inclined member 151, it is possible to easily assemble the connection tail 142 and to reduce the risk of disconnection in a door manufacturing process.

The cover glass seating groove 110G in which the cover glass 130 is mounted may be formed on the front surface of the door frame 110. The cover glass seating groove 110G may be formed in a shape corresponding to the shape of the cover glass 130. The cover glass seating groove 110G may be formed by being recessed from the front surface that is placed on the most forward of the door frame 110.

At the corner D2 in which the front surface (for example, the second region F2) of the door frame 110 and the inclined surface of the second inclined member 113 of the cover glass seating groove 110G intersect with each other, water formed by the condensed water vapor may be collected as mentioned above. The inclined structure may be formed to prevent the collected water from flowing into the gap formed by the cover glass 130, the touch panel 141, and the front surface of the door frame 110.

Referring to FIGS. 6, 7, 10 and 11, the second inclined member 113 may be provided in a portion, facing the side surface of the cover glass 130, of the cover glass seating groove 110G. The second inclined member 113 may correspond to a surface, facing the lower side among the side surfaces of the cover glass 130 and may be formed to be inclined downwardly toward the front side of the door frame 110.

Hereinafter a shape and formation position of an auxiliary drain hole 170 according to one embodiment of the present disclosure will be described in detail with reference to FIGS. 6 to 12.

The auxiliary drain hole 170 may be formed to allow the front surface and the rear surface of the door frame 110 to communicate with each other in the same manner as the drain hole 150. However, in terms of the shape and formation position, the auxiliary drain hole 170 may be different from the drain hole 150.

The auxiliary drain hole 170 may be provided in plurality, and each of the plurality of auxiliary drain holes 170 may be arranged on opposite sides of the drain hole 150, as shown, for example, in FIG. 6. The auxiliary drain hole(s) 170 may be positioned lower than the drain hole 150 with respect to the vertical direction. Particularly, the lower end 150L of the drain hole may be located higher than a lower end 170L of the auxiliary drain hole 170, as shown, for example, in FIG. 7.

The auxiliary drain hole 170 may be arranged on an upper side of the above-described second inclined member 113. The drain hole 150 may also be arranged above the above-described second inclined member 113. However, because the lower end 150L of the drain hole 150 is located higher than the lower end 170L of the auxiliary drain hole 170, the lower end 150L of the drain hole 150 may be formed to be spaced apart from the inclined surface of the second inclined member 113. The lower end 170L of the auxiliary drain hole 170 may be formed in contact with the inclined surface of the second inclined member 113.

The plurality of auxiliary drain holes 170 may have different lengths in the left and right directions. Alternatively, the plurality of auxiliary drain holes 170 may be formed to have the same width in the left and right directions.

Referring to FIGS. 6, 7 and 9, two auxiliary drain holes 170 are provided according to one embodiment of the present disclosure. However, the number of auxiliary drain holes 170 is not limited to the above-described number and may be provided in two or more. Alternatively, the number of auxiliary drain holes 170 may be appropriately formed according to the length of the width in the left and right direction of the door 100 of the microwave oven 1.

When viewed from the front side of the door 100, a through area of the auxiliary drain hole 170 (individually) may be less than a through area of the drain hole 150. A cross-section of the auxiliary drain hole 170 may be formed in a substantially rectangular shape, but is not limited thereto, and may be provided in various shapes capable of efficiently assisting the drainage function of the drain hole 150. In some embodiments, a plurality of auxiliary drain holes 170 may define a through area that collectively is greater than the drain hole 150. In other embodiments, the collective through area of the auxiliary drain holes 170 may be equal to or less than the through area of the drain hole 150.

Referring to FIGS. 7 and 12, the auxiliary drain hole 170 may be formed in such a way that a length of a left and right width is reduced as the auxiliary drain hole 170 penetrates from the front surface to the rear surface of the door frame 110 (D3). That is, the auxiliary drain hole 170 may be formed in such a way that a cross-sectional area thereof gradually decreases as the auxiliary drain hole 170 penetrates from the front surface to the rear surface of the door frame 110 (D3). Due to this structure, it is possible to efficiently manufacture a mold for injecting the door frame 110.

The above-described two auxiliary drain holes 170 may be formed at opposite lower ends of the drain hole 150 and thus the collected water, which is not drained by the drain hole 150, may be drained through the auxiliary drain holes 170.

Figure 13:
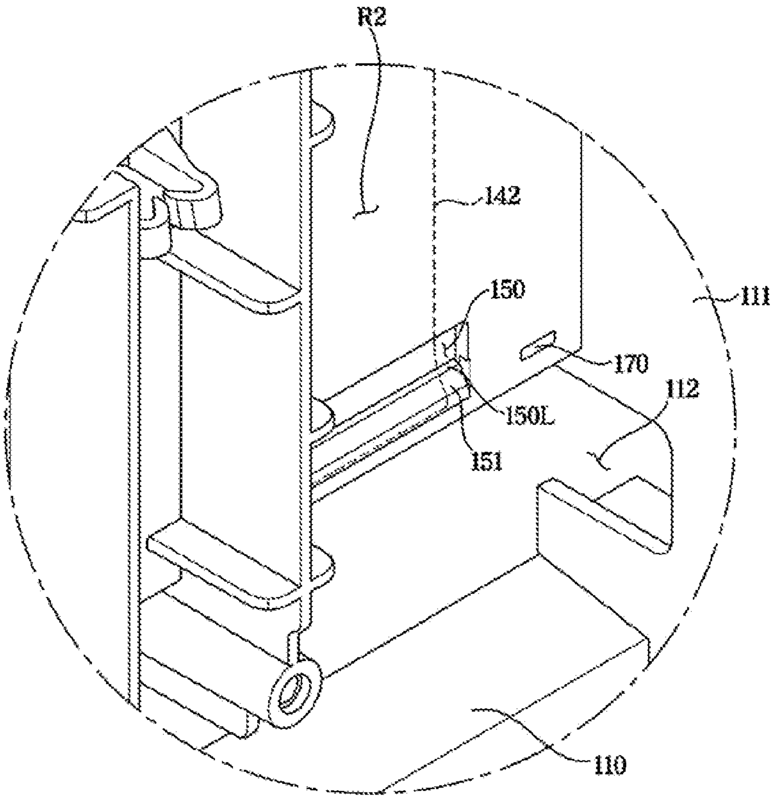
FIG. 13 is a view illustrating a state in which a coupling flange hole is formed in the door of FIGS. 5 and 8.

FIG. 13 is a view illustrating a state in which a coupling flange hole is formed in the door of FIGS. 5 and 8.

Referring to FIG. 5, the door frame 110 may further include the coupling flange 111 provided to surround the inner frame 120 and coupled to the inner frame 120. The coupling flange 111 may protrude backward from the rear surface of the door frame 110. The coupling flange 111 may be formed in the region R1, corresponding to the first region F1, of the rear surface of the door frame 110. The coupling flange 111 may be provided to define the region R1, corresponding to the first region F1, of the rear surface of the door frame 110 and the coupling flange 111 may be provided to define the region R2, corresponding to the second region F2, of the rear surface of the door frame 110.

The coupling flange 111 may include a coupling flange hole 112 (FIG. 13) provided to allow the region R1, corresponding to the first region F1, of the rear surface of the door frame 110 to communicate with the region R2, corresponding to the second region F2, of the rear surface of the door frame 110. FIG. 13 illustrates that the coupling flange hole 112 is formed in a substantially square shape, but is not limited thereto. That is, the coupling flange hole 112 may be formed in various shapes as long as such coupling flange hole 112 allows the region R1, corresponding to the first region F1, of the rear surface of the door frame 110 to effectively communicate with the region R2, corresponding to the second region F2, of the rear surface of the door frame 110.

Particularly, the coupling flange hole 112 may be formed in a region adjacent to the drain hole 150 formed on the rear surface of the door frame 110. Further, the coupling flange hole 112 may be formed in a region adjacent to the auxiliary drain hole 170. Due to this structure, it is possible to secure a volumetric capacity through which water flowing out from the drain hole 150 and the auxiliary drain hole 170 is more effectively evaporated.

In addition, the auxiliary drain hole 170 may perform a function as a through member through which a conducting wire, which extends from the controller 160 to connect the main body 10 of the microwave oven to the controller 160, passes.

Figure 14:
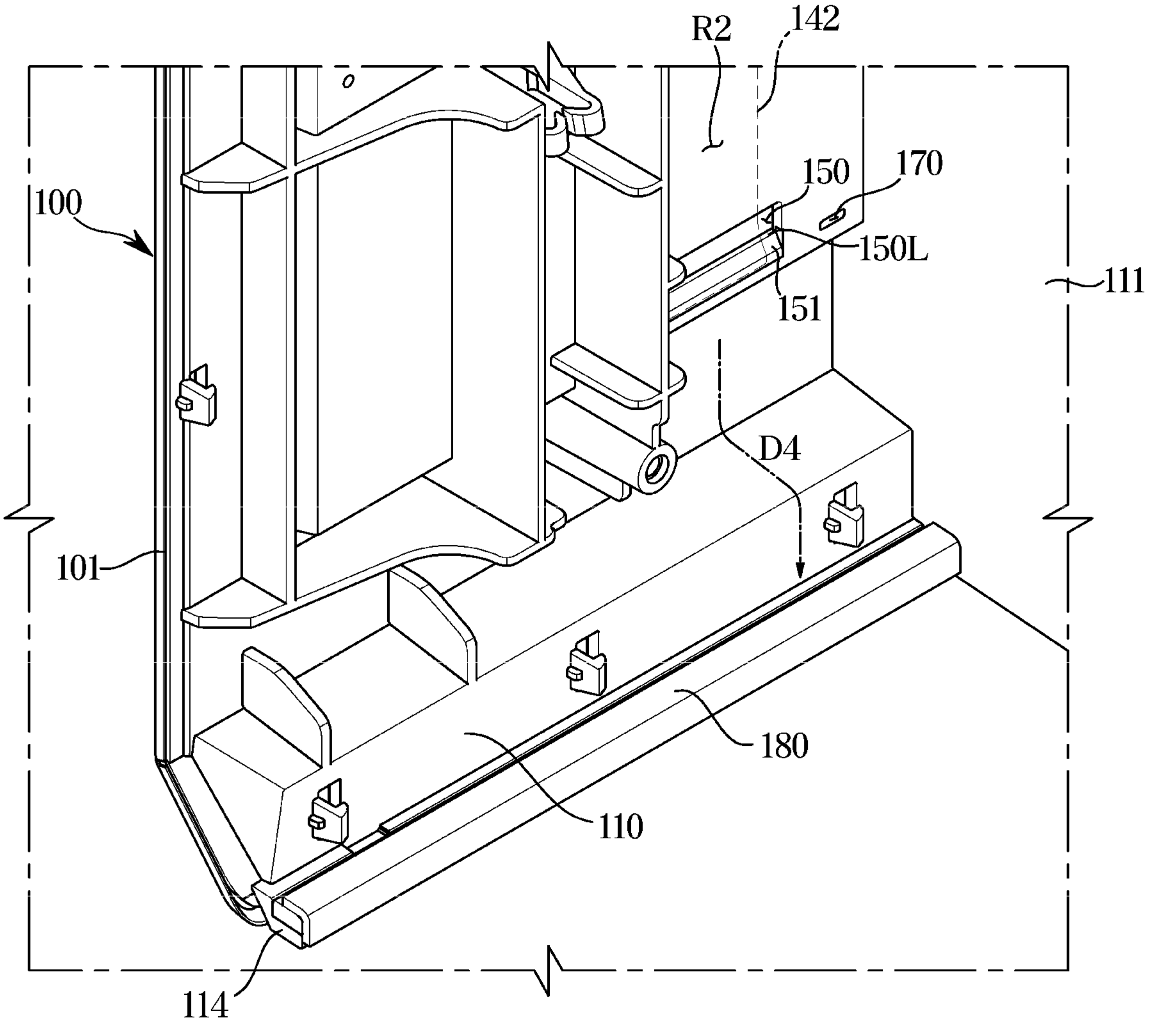
FIG. 14 is a view illustrating a state in which a sponge arranged at a lower end of the drain hole among edges of the rear surface of the door frame is arranged.
Figure 15:
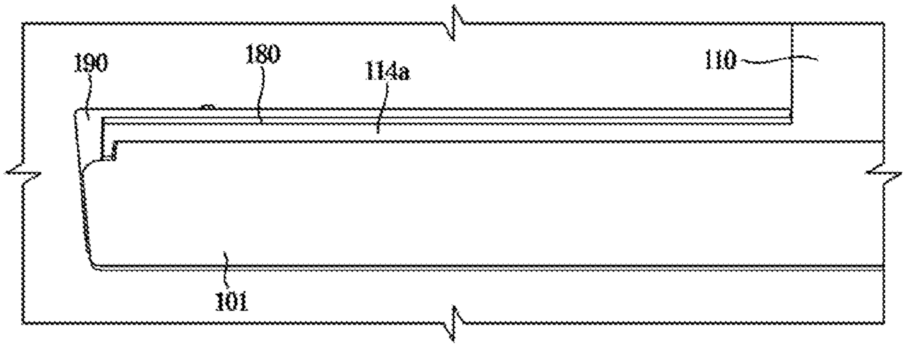
FIG. 15 is a bottom view illustrating a part of the door in a state in which a rear cover is mounted to the door frame of FIG. 14.

FIG. 14 is a view illustrating a state in which a sponge 180 arranged at a lower end of the drain hole 150 among edges of the rear surface of the door frame is arranged. FIG. 15 is a bottom view illustrating a part of the door in a state in which a rear cover is mounted to the door frame of FIG. 14.

Referring to FIG. 14, the door 100 may further include a sponge 180 arranged along the edge 114 of the door frame 110. Particularly, the sponge 180 may be arranged at a lower end 114*a* of the drain hole (refer to FIG. 5) among the edges 114 of the rear surface of the door frame 110. The sponge 180 may be arranged at a lower end of the region R2, corresponding to the second region F2, of the rear surface of the door frame 110. That is, a length of a left and right width of the sponge 180 may be formed to approximately correspond to the length of the width of the second region F2.

On the rear surface of the door frame 110, water drained through the drain hole 150 may be moved downward along a direction D4. In this process, the water drained out may be evaporated, but a remaining portion that is not evaporated may continue to flow downward and fall on the other cooking apparatus 2 located under the microwave oven 1.

Therefore, by positioning the sponge 180 to the above-described position so as to absorb the remining portion, which is not evaporated, of the drained water, it is possible to reduce a risk in that the other cooking apparatus 2 is damaged by the remaining water.

The rear cover 190 provided to cover the controller 160, the drain hole 150, and the connection tail 142 may be arranged at the rear of the door frame 110. The rear cover 190 may be provided to cover a portion of the rear surface of the door frame 110. The rear cover 190 may be provided to cover the region R2, corresponding to the second region F2, of the rear surface of the door frame 110.

The rear cover 190 may be coupled to the door frame 110 at the rear of the door frame 110. The rear cover 190 may be provided in a shape corresponding to the edge 114 of the door frame. The rear cover 190 may be coupled to the door frame 110 by pressing the sponge 180 to the edge 114 of the rear surface of the door frame 110. Due to this structure, the sponge 180 may be more firmly coupled to the door frame 110.

While the present disclosure has been particularly described with reference to exemplary embodiments, it should be understood by those of skilled in the art that various changes in form and details may be made without departing from the spirit and scope of the present disclosure.

What is claimed:

1. A cooking apparatus comprising:
a main body comprising a cooking chamber comprising an opening provided to be opened forward; and
a door coupled to the main body so as to open and close the cooking chamber,
wherein the door comprises:
a door frame;
a cover glass arranged on a front surface of the door frame;
a touch panel arranged between the cover glass and the front surface of the door frame and provided to be in close contact with the front surface of the door frame by being pressed by the cover glass;
a drain hole arranged at a region of the front surface of the door frame that corresponds to a lower end of the touch panel, wherein the drain hole is provided to allow a front surface and a rear surface of the door frame to communicate with each other; and
wherein a lower end of the drain hole is formed at a lower position than a lower end of the touch panel.

2. The cooking apparatus of claim 1, further comprising:
a connection tail from which an electric wire, which is provided to transmit a signal inputted through the touch panel, extends,
wherein the connection tail extends from the front surface of the door frame to the rear surface of the door frame by passing through the drain hole.

3. The cooking apparatus of claim 2, wherein
the drain hole comprises a first inclined member formed on a lower end of an inner surface of the drain hole to be inclined to the rear surface of the door frame.

4. The cooking apparatus of claim 3, wherein
the connection tail is supported by the first inclined member.

5. The cooking apparatus of claim 2, further comprising:
a controller arranged above the drain hole, on the rear surface of the door frame,
wherein the connection tail is connected to the controller.

6. The cooking apparatus of claim 1, wherein
the door frame further comprises a cover glass seating groove recessed from the front surface of the door frame to allow the cover glass to be mounted thereon,
wherein the cover glass seating groove comprises a second inclined member formed in such a way that a surface, facing a lower surface among side surfaces of the cover glass, is inclined.

7. The cooking apparatus of claim 6, wherein
the second inclined member is inclined downwardly toward a front side of the door frame.

8. The cooking apparatus of claim 6, wherein
the cover glass is coupled to the door frame by an adhesive.

9. The cooking apparatus of claim 1, wherein
the door frame further comprises an auxiliary drain hole formed to allow the front surface and the rear surface of the door frame to communicate with each other.

10. The cooking apparatus of claim 9, wherein
the auxiliary drain hole is positioned lower than the drain hole.

11. The cooking apparatus of claim 9, wherein
the auxiliary drain hole is formed having a cross-sectional area that decreases as the auxiliary drain hole penetrates from the front surface to the rear surface of the door frame.

12. The cooking apparatus of claim 9, wherein the auxiliary drain hole is provided in plurality, and each of the plurality of auxiliary drain holes is arranged on opposite sides of the drain hole.

13. The cooking apparatus of claim 1, wherein
the door further comprises a sponge provided to absorb water flowing down from the drain hole, the sponge being arranged at a lower end of the drain hole, among edges of the rear surface of the door frame.

14. The cooking apparatus of claim 13, wherein
the door further comprises a rear cover provided to cover the rear surface of the door frame and coupled to the door frame,
wherein the rear cover is coupled to the edge of the rear surface of the door frame while pressing the sponge.

15. The cooking apparatus of claim 1,
wherein
the door frame further comprises a coupling flange provided to surround and be coupled to an inner frame, to which an inner glass is fixed and faces the cooking chamber, the coupling flange protruding backward from the rear surface of the door frame,
wherein the coupling flange comprises a coupling flange hole formed at a region corresponding to a position in which the drain hole is formed and provided to penetrate the coupling flange.

16. The cooking apparatus of claim 1, wherein
the touch panel is coupled to the cover glass by an adhesive.

* * * * *